(12) United States Patent  
Feil et al.

(10) Patent No.: US 7,940,445 B2  
(45) Date of Patent: May 10, 2011

(54) MIRROR SYSTEM FOR A VEHICLE AND METHOD OF OPERATING SAID MIRROR SYSTEM

(75) Inventors: Hermanus Feil, Valkenswaard (NL); Bente A Bordes, Waalre (NL)

(73) Assignee: Miortech Holding B.V., Eindhoven (NL)

( * ) Notice: Subject to any disclaimer, the term of this patent is extended or adjusted under 35 U.S.C. 154(b) by 65 days.

(21) Appl. No.: 12/449,050

(22) PCT Filed: Jan. 17, 2008

(86) PCT No.: PCT/NL2008/000022  
§ 371 (c)(1),  
(2), (4) Date: Sep. 9, 2009

(87) PCT Pub. No.: WO2008/088214  
PCT Pub. Date: Jul. 24, 2008

(65) Prior Publication Data  
US 2010/0067093 A1 Mar. 18, 2010

(30) Foreign Application Priority Data  
Jan. 19, 2007 (WO) ............... PCT/NL2007/000014

(51) Int. Cl.  
*G02B 26/02* (2006.01)  
*G02B 5/08* (2006.01)

(52) U.S. Cl. ...................... 359/228; 359/838

(58) Field of Classification Search .................. 359/228, 359/290, 838, 855, 886  
See application file for complete search history.

(56) References Cited

U.S. PATENT DOCUMENTS

2006/0132927 A1 6/2006 Yoon  
2008/0297880 A1 12/2008 Steckl et al.  
2010/0225611 A1* 9/2010 Lee et al. ....................... 345/174

FOREIGN PATENT DOCUMENTS  
WO   WO 2006/017129   2/2006

OTHER PUBLICATIONS  
International Search Report mailed Mar. 6, 2008 in PCT Appln. PCT/NL2008/000022.

* cited by examiner

*Primary Examiner* — David N Spector  
(74) *Attorney, Agent, or Firm* — Davidson Berquist Jackson & Gowdey, LLP (57) ABSTRACT

The present invention is directed to a mirror system for a vehicle, said mirror system having a viewing surface for being operable as a mirror, said mirror system comprising a specular reflective surface and means for controlling an amount of light transmitted between said specular reflective surface and said viewing surface, said means for controlling said amount of light transmitted comprising at least one transmission control element and control means for controlling said transmission control element, characterised in that said transmission control element is an electrowetting element. The present invention is further directed to a method of operating said mirror system.

33 Claims, 3 Drawing Sheets

MIRROR SYSTEM FOR A VEHICLE AND METHOD OF OPERATING SAID MIRROR SYSTEM

FIELD OF THE INVENTION

The present invention is directed to a mirror system having a viewing surface for being operable as a mirror, said mirror system comprising a specular reflective surface arranged for reflecting at least a portion of light incident on the mirror system, and means for controlling an amount of light transmitted between said specular reflective surface and said viewing surface, said means for controlling said amount of light transmitted comprising at least one transmission control element and means for controlling said transmission control element, wherein said transmission control element comprises an electrowetting element.

The present invention further relates to a method of operating a mirror system comprising a viewing surface for being operable as a mirror, a specular reflective surface arranged for reflecting at least a portion of light incident on the mirror system, and means for controlling an amount of light transmitted between said specular reflective surface and said viewing surface, said means for controlling said amount of light transmitted comprising at least one transmission control element and means for controlling said transmission control element, wherein said transmission control element comprises an electrowetting element.

A well-known drawback of vehicle mirrors, such as a rear view mirrors and side mirrors, is that to the annoyance of many drivers, such mirrors tend to blind a driver when at night a high intensity light source is present behind the vehicle. As an example, drivers are often blinded by cars following the vehicle on the road behind them, if for instance the head lights of such following cars are insufficiently directed to the road itself or the car is overloaded. Another annoying source that may blind a driver is the rising or setting sun early in the morning or late in the afternoon.

One way of overcoming this problem is through the use of birefringent mirrors, of which the orientation can be easily altered by the driver such as to direct most of the incident light in a different direction than to the eyes of the driver. Such birefringent mirrors direct only a small part of the incident light to the drivers' eyes, in order to enable the driver to still see headlights of vehicles and some detail of the road behind him.

A disadvantage of the use of birefringent mirrors, is that a rather large amount of light is dimmed by the mirror, and only a small part of the light is transmitted to the driver. Such mirrors therefore tend to reduce the amount of light too much, such that quite a lot of detail of the traffic situation behind the vehicle is lost. The amount of dimming by the birefringent mirror cannot be controlled by the driver, the mirror is either in a full reflective mode, or in a dimmed reflective mode.

Another disadvantage of the use of birefringent mirrors, is that when the driver is suddenly blinded by a large amount of light behind the vehicle, the mirror must be placed in the dimmed state manually by the driver. As will be understood, this process is usually too slow, and is therefore a threat to safety. The driver is still initially blinded by the mirror, before the amount of light is reduced.

In recent years, manufacturers of car parts have recognized this problem and have developed automatically dimming car mirrors that make use of a number of different techniques. Early versions of automatically dimming car mirrors are simply birefringent mirrors that were driven automatically in the full reflective or dimmed state by an actuator, dependent on the amount of light measured by a detector. As will be understood, switching of the mirror to the dimmed state is in this case still relatively slow, and the disadvantages of loss of detail as a result of over-reducing of the amount of light is not resolved by these earlier versions.

Later versions of automatically dimming car mirrors were based on the use of electro-chromic material layers that were coated on the reflective side of the mirror. Electro-chromic materials are materials of which the optical properties change when a voltage is applied to the materials. Controlling of these types of automatically dimming vehicle mirrors, is performed by means of applying a voltage over the electro-chromic material, as a result of which the transmission coefficient of the material changes. The amount of light reflected by the automatically dimming vehicle mirror can be controlled by controlling the voltage level applied to the electro-chromic material.

A disadvantage of these automatically dimming electro-chromic based vehicle mirrors, is that the time required to switch the electro-chromic mirror to a different level of transmission is relatively long (in the order of one second). An electro-chromic based car mirror is therefore not able to adequately respond to sudden changes in the amount of light incident on the mirror. Therefore, if the car changes direction, or if a vehicle behind the car suddenly switches on its main lights, the driver is still blinded by it, and may be startled by the sudden change of light level.

Another disadvantage of automatically dimming car mirrors based on electro-chromic (polymer) layers, is that the electro-chromic (polymer) layer is coated as a single layer over the full surface of the mirror. Dimming the mirror can therefore only be performed over the full surface, and in order to be able to control different parts of the surface independently from each other, these different parts of the surface must be electrically isolated and being coated with separate electro-chromic material layers.

In addition, there has been a recent demand to provide car mirrors with integrated display technology, e.g. in order to present basic information. Car mirrors based on electro-chromic technology are not suitable for integrating display technology, and as a result, in order to integrate a display in an electro-chromic car mirror, the display must be integrated as a separate unit. This, for example, requires that a part of the specular reflective surface of the mirror has to be removed in order to provide visible access to the display. The skilled person will appreciate that this is not the most elegant solution for integrating display technology in a mirror.

Alternatively, the specular reflective surface of the mirror is only a one-way mirror, or is semi-transparent where the display is located. A disadvantage of this is that the semi-transparent or one-way mirror layer in between the display and the viewing surface of the mirror, darkens or at least to some degree obstructs visibility of the display.

A more recent technology used for providing automatically dimming car mirrors, is to provide a car mirror with a transmissive type liquid crystal display element (LCD) placed on top of the specular reflective surface of the mirror. As is well-known to the skilled person, liquid crystal display technology is based on a layered structure of two polarizing layers wherein the polarization direction of the layers is perpendicular to each other. In between the polarizing layers, there is provided a liquid crystal layer, which is capable of rotating the polarization direction of the light in a degree that is dependent on the voltage applied over the liquid crystal layer. Therefore, by amending the voltage level applied over the liquid crystal layer, the liquid crystal display is either switched in a transmissive mode, or in a non-transmissive mode. This principle can be used to control the amount of light reflected by the mirror to the driver.

A disadvantage of the use of liquid crystal display technology is that liquid crystal display technology makes use of multiple polarization filters. As a result of this, the amount of light reflected by the mirror is at least reduced by 50%, also when the liquid crystal display layer is fully transmissive. As will be understood, this is an undesired effect of LCD in this respect.

Another disadvantage that results from the use of polarized light, is that the viewing angle of the mirror is limited. Defining the viewing angle as the angle between the viewing direction, and the direction normal to the mirror surface, it is not possible to observe the mirror under a large angle. The skilled person appreciates that limitation of the viewing angle is highly undesired for vehicle mirrors, since vehicle mirrors are never located in front of the driver, but are always observed under an angle.

Another disadvantage of the use of liquid crystal display technology is that the functionality of this technology is to a large extent dependent on the ambient temperature. Therefore, when outside temperatures are below freezing level, the switching speed of liquid crystal displays is largely reduced. The skilled person will appreciate that when a vehicle has been at rest overnight during wintertime, the temperatures within the cabin of the vehicle may drop below freezing level. Mirrors placed outside the vehicle cabin, such as side mirrors on a vehicle, are even to a larger extent affected by this phenomenon, since the outside temperatures are even lower than the cabin temperatures.

United States Patent Application no. US 2006/0132927, which is primarily directed to electrowetting elements, discloses an embodiment of an electrowetting element comprising a specular reflective posterior electrode opposite an anterior electrode of the element, and separated therefrom by the interior of the element comprising immiscible anterior and posterior liquids.

The skilled reader may appreciate that such an arrangement is not suitable for integrating display functionality with mirror functionality, since the mirror may under high light level conditions outshine the visibility of the display, and under low light level conditions render the display invisible.

United States Patent Application no. US 2006/0132927 further discloses the use of a liquid metal, such as mercury, gallium or indium, as one of the interior liquids of the optical stack, enabling the switching between a transparent state and a specular reflective state.

It is needless to mention that the use of mercury provides a considerable environmental and safety risk. This risk will be even larger if such a switchable mirror is applied in a vehicle, such as a car, since the mirror may easily break into pieces during a traffic accident, releasing the mercury inside. Other liquid metals are, besides their toxic and environmentally hazardous nature, unsuitable for use under outdoor conditions or in a vehicle, since their freezing temperatures are mostly above 25° C.

In addition, in order to integrate both display and mirror functionality, the proposed solution in US 2006/0132927 is unsuitable. The embodiment described based on liquid metal only enables switching between a transparent and reflective state.

As will be recognized by the skilled person, the technologies used for providing automatically dimming car mirrors, that are available in the prior art, still suffer from many disadvantages that have not been overcome, and that adversely affect functionality of these mirrors.

SUMMARY OF THE INVENTION

It is an object of the present invention to provide a dimmable car mirror that does not suffer from the above disadvantages of the prior art, and that is able to control the amount of light reflected by the mirror system adequately under all circumstances.

It is a further object of the present invention to enable integrating information presentation means into said dimmable mirror arrangement, without compromising functionality and visibility of both the mirror means and the information display means.

These and other objects have been achieved by the present invention in that there is provided a mirror system having a viewing surface for being operable as a mirror, said mirror system comprising a specular reflective surface arranged for reflecting at least a portion of light incident on the mirror system, and means for controlling an amount of light transmitted between said specular reflective surface and said viewing surface, said means for controlling said amount of light transmitted comprising at least one transmission control element and means for controlling said transmission control element, wherein said transmission control element comprises an electrowetting element, characterised in that, said mirror system further comprises backlighting means, and said specular reflective surface is further arranged for enabling transmission of light from said backlighting means, and wherein said specular reflective surface and said transmission control element are arranged for cooperatively, in operation, transmitting said light from said backlighting means conversely dependent on transmission of light reflected by said specular reflective elements.

By using additional backlighting means and enabling transmission of light from said backlighting means through said specular reflective surface, information can be presented to the user of the mirror system. Because the specular reflective surface and the transmission control element are arranged for cooperatively, in operation, transmitting said light from the backlighting means conversely dependent on transmission of light reflected by the specular reflective elements, it becomes possible to achieve both display and mirror functionality without one functionality obstructing the other. When the light from the backlighting means is maximally transmitted by the transmission control element, transmission of reflected light is minimal or negligible, and as a result visibility of the presented information is not compromised by light reflected. In addition, the solution resolves the problems of the prior art.

Electrowetting technology is based on modification of an energy balance between on one hand surface tension forces of liquids and wetting properties of a solid surface, and on the other hand electrostatic forces induced by an applied voltage over a capacitor arrangement comprising said boundary layer.

An electrowetting element may subsequently from bottom to top be comprised of respectively a first electrode layer, an electrically insulating hydrophobic layer (i.e. having a hydrophobic surface on a side opposite the side adjacent or nearest to the first electrode layer), a mixture of two liquids comprising at least a polar liquid and a non-polar liquid, and a second electrode in contact with at least the polar liquid. In practice, the liquids are contained in between for example pixel walls forming a containment tray and a top glass plate.

Various materials can be used for the electrically insulating hydrophobic layer, e.g. Teflon™ (Polytetrafluoroethyline (PTFE)) is a suitable material having suitable optical and electrical properties. As a non-polar liquid, one may use an oil such as decane. The selection criteria for selecting a suitable non-polar liquid include (apart from the liquid being non-polar), dielectric constant sufficiently large (the liquid is preferrably a good isolator, or at least a poor conductor) and having an optical transmission coefficient that is suitable for the application wherein it is used (in practice the liquid will have low transmissibility, but in the present invention, a certain (small) degree of transmissibility may be advantageous, though not essential). Optical properties may be modified or adapted by introducing a small percentage of a dye in the non-polar liquid as an additive. The polar liquid preferably has good conductive properties, and should additionally be selected with respect to its optical properties. Preferably, the polar liquid is optically transmissive.

The principles of operation of an electrowetting element are as follows. In an unpowered state, i.e. when no voltage is applied over the first and second electrode, the lowest energetic state of the system is where the non-polar liquid forms a boundary layer between the polar liquid and the hydrophobic surface of the insulating layer. This is because the polar liquid is repelled by the hydrophobic layer. The poor transmissibility of the non-polar liquid then forms an obstruction to light that penetrates the system. When a voltage is applied over the electrodes, the lowest energetic state of the system becomes the situation wherein the (poorly conductive or insulating) non-polar liquid is pushed aside by the (conductive) polar liquid, and the polar liquid thereby being in direct contact with the insulating hydrophobic layer. Note that the voltage must be large enough for the electrostatic forces to overcome the repellent and surface tension forces that separate the polar liquid from the hydrophobic surface. In this situation, light that penetrates the system has rather unobstructed access to the insulating hydrophobic layer because of the well transmissibility of the polar liquid and the non-polar liquid being pushed aside.

The use of electrowetting technology in order to control the transmitted fraction of light reflected by the specular surface of the mirror system, has the benefit that the mirror remains its large viewing angle, and does not noticeably reduce the amount of light reflected by the mirror when the display is switched in a fully transmissive state. Electrowetting displays can be switched at very short switching times (i.e. the duration of time required to change from a non-transmissive state to a transmissive state, or vice versa, after changing the voltage level). Switching of electrowetting displays can be performed slightly faster than switching of liquid crystal displays, however the switching time, and other properties that determine the functionality of electrowetting elements, are less dependent on the ambient temperature of the environment. Therefore, the functionality of the mirror system according to the present invention is hardly affected by the temperature outside.

As a result of the fast switching time and flexible operability of electrowetting displays, quick response to sudden changes of the light level incident on the viewing surface of the mirror is possible with the present invention.

In accordance with an embodiment of the invention, said specular reflective surface comprises at least one transmissive surface area part which is at least partly transparent for said light from said backlighting means, and at least one specular reflective surface area part which is opaque for light from said backlighting means. This is a very convenient manner of providing a specular reflective surface arranged for both enabling transmission of backlight and specular reflection of light from the viewing surface, which in particular corresponds to the functioning of an electrowetting element that is based on the rearrangement of relative positions immiscible liquids. This will be explained below.

Said electrowetting element, according to an embodiment, comprises at least one first liquid and at least one second liquid, said first liquid being less transparent than said second liquid, and wherein transmission is controlled in operation by rearranging said first liquid relative to said second liquid, and wherein said electrowetting element is arranged for, in operation, in a first state contracting said first liquid such that said transmissive surface area part is substantially covered by said first liquid, and in a second state spreading said first liquid such that at least said specular reflective surface area part is substantially covered by said first liquid.

It is noted that in a first state, wherein electrodes of an electrowetting element are not (sufficiently) powered, the first less transparent non-polar liquid may cover the reflective surface completely. Since the first liquid covers the full reflective surface, the thickness of the first liquid layer covering the surface may be sufficiently thin in order to transmit sufficient light from the backlighting means (travelling through the first liquid layer in a single pass), whilst at the same time, the thickness of the first liquid layer is sufficiently thick in order to sufficiently reduce the amount of light that is reflected by the specular reflective surface (note that the reflected light has to pass the first liquid layer twice: once going into the electrowetting element, and once on the return path back to the viewing surface). In the second state, the first liquid layer may be pushed aside by the second (transparent) liquid layer. The first liquid layer may substantially cover the transmissive surface area part, but not the specular reflective surface area part. In the second state, the thickness of the first liquid layer above the transmissive surface area part may be much thicker than in the first state, such that in the second state, light from the backlighting means is essentially blocked (or at least its intensity is sufficiently reduced such that it is invisible to a user) while the specular reflected light is transmitted by means of the second liquid layer essentially pushing aside the first liquid layer and providing optical access to the specular reflective surface area part. In this embodiment, said transmission control element is arranged for controlling transmission of light received through said transmissive surface area part conversely dependent on transmission of light received through said specular reflective surface area part. It is noted that this may be achieved with different configurations than as described above.

According to an embodiment of the present invention, the electrowetting element of the mirror system comprises a plurality of segments, and the control means are arranged for controlling the segments independently from each other. In accordance with this embodiment, certain parts of the electrowetting element integrated in the mirror system can be controlled as a group, independently of other parts of the electrowetting element.

By providing such independently controllable segments, it becomes possible to provide basic information to the driver via the mirror system, without requiring complex technology for controlling a fully functional display. This enables, for example, the displaying of arrows, e.g. cooperating with a navigation system for indicating a direction of travel, or other features such as alarm signals, alfa numeric display elements etc.

The backlighting means may be located on the side of the mirror system opposite the viewing surface. According to an embodiment of the invention, the backlighting means may for example be arranged for providing light for transmission through at least one of said segments of said electrowetting element.

By providing additional backlighting means for lighting certain segments of the electrowetting elements, the presentation of information through these segments is improved by improving contrast between the segments and the other parts of the mirror system. This is not only beneficial at night, when the overall incident amount of light on the mirror system is on average low, but can also increase the visibility of information presented in the mirror during day time.

In a particular embodiment thereof, the control means of the present invention are further arranged for controlling operation of the backlighting means. By operating the backlighting means through the control means, operation of the backlighting means and operation of the other parts of the display elements can be matched with each other. Note that the backlighting means may alternatively be controlled through separate dedicated control means.

In a preferred embodiment, said means for controlling said transmission control element and said means for controlling operation of said backlighting means are arranged for cooperating with each other. Note that controlling the backlighting means may be controlled such as to provide backlight only when certain segments of the display are switched in a state wherein specular reflected light is essentially blocked while backlight is essentially transmitted. This enables darkening of other segments of the mirror without backlighting these other segments, or different backlighting segments of the screen independently from each other.

According to another embodiment of the present invention, the electrowetting element of the mirror system is formed by a plurality of pixel elements, and the specular reflective surface comprises a plurality of reflective elements. The reflective elements may only partly cover a surface area of the pixel elements in sense that in some parts of the surface area of the pixel elements the specular reflective surface is not present. This can be achieved in various ways. According to one particular embodiment, the dimensions of the reflective elements are such that the reflective elements only partly cover the surface area of the pixel elements. For example, the width of the reflective elements may be smaller than the width of the pixel elements, leaving the surface area of the pixel element partly uncovered. Another means of achieving this effect, in accordance with another embodiment, is where the reflective elements comprise a hole or cutout portion such that the reflective elements only partly cover the surface area of the pixel elements, i.e. the surface area of the pixel element is not covered where the cutout portion or hole is located. In particular, it is noted here that light from behind the mirror system, i.e. as seen from the viewing surface behind the specular reflective surface, is enabled to pass through the part of the pixel element which is not overlapping the reflective element. This enables light from backlighting means to potentially penetrate through the pixel element in order to be visible at the viewing surface, dependent on optical properties of the various layers and used liquids.

According to another embodiment of the present invention, the electrowetting element of the mirror system is formed by a plurality of pixel elements, and said control means are arranged for controlling the pixel elements independently from each other. As will be appreciated by the skilled person, by enabling control of the pixel elements of the present invention independently from each other, it becomes possible to use the mirror system, or a part thereof such as one of the segments defined hereinabove, as a fully operable display means for displaying detailed information. It is noted here that electrowetting display technology can be used to provide high resolution displays for presenting moving images. As already mentioned, the control means may be arranged for controlling the pixel elements of at least one segment of the plurality of segments mentioned hereinabove, independently of each other. The use of fully functional display technology for providing (moving) images, in the mirror system is thereby restricted to only a part of the mirror.

According to another embodiment of the present invention, one or more of the pixel elements comprises a colour filter. By using a colour filter, information may be provided to the driver of the vehicle in colour. The presentation of information in colour contributes to the visibility of this information. Of course, also the use of coloured backlighting means is foreseen.

According to yet another embodiment of the present invention, each of said pixel elements comprises a colour filter of a colour selected from a group comprising red, green and blue, wherein groups of three or more adjacently arranged pixel elements are formed in said electrowetting element and wherein each group of pixel elements comprises at least one pixel element having a red colour filter, at least one pixel element having a green colour filter, and at least one pixel element having a blue colour filter, for enabling full colour displaying of images by said electrowetting element. The full colour motion display may be part of the viewing surface of the mirror system, and can be used to display all sorts of information, such as information from cameras placed on and/or in the vehicle, e.g. for watching obstacles while driving backwards or for monitoring children or babies in child seats in the back of the car. For reasons of safety, this information usually should not be distractive to the driver.

As an alternative to the above, according to another embodiment of the present invention, the backlighting means are arranged for providing light of at least three colours and the control means are arranged for controlling the backlighting means such that the backlighting means provide light of different colours of said at least three colours, sequentially in time and in a periodic manner. For example, the control means may control the backlighting means such that the backlighting means provide a series of short duration light signals of different colours sequentially in time, e.g. red, blue, green, red, blue, green, red, blue, . . . , etc. The sequence of a red light signal, a blue light signal, and a green light signal is periodically repeated by the backlighting means. By switching a pixel element such that light is transmitted for at least the duration of the red, blue and green signal, the colour of the pixel will be experienced by the viewer as white, i.e. the human eye cannot discriminate between each of the subsequent pulses, and hence an overall white coloured pixel is observed. Also when, synchronized with the pulses provided by the backlighting means, the pixel element is switched in a transmitted state only during part of the red signal and the full blue signal, the pixel colour is experienced by the viewer as being (deep) purple. The colour of the pixel can be varied by adapting the ratio of red, blue and green present in the light transmitted from the backlighting means to the viewing surface by the pixel element. The person skilled in the art will appreciate that time sequential switching for enabling full colour displays is well known in the field of display technology, and can be used advantageously in combination with the present invention.

According to another specific embodiment, the electrowetting element comprises one or more electrodes (i.e. for switching the electrowetting element or the pixel element in a transmissive/non-transmissive state), and the specular reflective surface is formed by at least one side of said electrodes. In particular the electrodes may advantageously also provide the specular reflective surface layer. This can be achieved by using a suitable material for the electrodes, by making the surface of the electrodes sufficiently smooth (e.g. by means of polishing) or by coating the electrodes with a specular reflective coating or by any other means within reach of the person having ordinary skills in the art.

According to another embodiment, the electrowetting element is formed by a plurality of pixel elements, and said pixel elements are separated by pixel walls, wherein the mirror system is arranged for being non-reflective near said pixel walls. The pixel walls are usually too small to be visible for the viewer, however the non-visible pixel walls may produce artifacts and may blur the image provided through specular reflection in the mirror. This effect is countered by making the mirror system non-reflective near the pixel walls. In that case, the image provided by the mirror is only formed by light rays reflected directly from the specular reflective surface, which are not affected by the presence of pixel walls. According to a preferred embodiment thereof, the pixel walls are made of a non-transmissive material. This non-transmissive material may, for example, be a dark material that does not transmit or reflect light rays incident thereon. It has been observed that the image produced by such a mirror system is perfectly sharp. According to another embodiment, the mirror system comprises a non-transmissive screen for blocking transmission of light near the pixel walls.

In a further embodiment of the invention, the mirror system comprises aperture means arranged for blocking at least part of said light from said backlighting means, for illuminating a light pattern on said mirror system using said backlighting means. Said light pattern may for example resemble an indicator sign for presenting information to a user of said mirror system. This provides a very basic means of displaying information to the user of the mirror system.

In accordance with a second aspect of the present invention, there is provided a method of operating a mirror system according to the first aspect, said mirror system comprising a viewing surface for being operable as a mirror, a specular reflective surface arranged for reflecting at least a portion of light incident on the mirror system, and means for controlling an amount of light transmitted between said specular reflective surface and said viewing surface, said means for controlling said amount of light transmitted comprising at least one transmission control element and means for controlling said transmission control element, wherein said transmission control element comprises an electrowetting element, characterised in that, said mirror system further comprises backlighting means, and said specular reflective surface is further arranged for enabling transmission of light from said backlighting means, said method comprising a step of controlling said transmission control element cooperatively with said specular reflective surface such that said light from said backlighting means is transmitted conversely dependent on transmission of light reflected by said specular reflective elements.

According to an embodiment of the second aspect, said transmission control means switch said transmission control element in a transmissive mode and a non-transmissive mode respectively, in a periodic manner. By switching the electrowetting display on and off in respectively a transmissive mode and a non-transmissive mode, in a periodic manner, the amount of light transmitted from the mirror can be controlled while the contrast of the image provided by the mirror is not affected.

Further to this, the duty cycle of said periodic switching of said electrowetting element is controlled by said control means for controlling an overall transmission of the electrowetting element. As will be understood, by controlling the duty cycle, i.e. the ratio between the time duration wherein the electrowetting display is respectively switched on off, the amount of light transmitted to the driver can be effectively controlled. The frequency at which the electrowetting element is switched on and off must be sufficiently large, such that switching the display element on and off is not observable to a human eye. Since switching times of an electrowetting display are and short and hardly affected by ambient temperatures, electrowetting elements are particularly capable of being switched on and off at such a sufficiently high frequency. This will provide a still and relaxed mirror image, not stressful to the eye.

Where the mirror system of the present invention comprises backlighting means located on a side of the mirror system opposite the viewing surface, and which backlighting means are arranged for providing light for transmission through at least one of the segments of the electrowetting element, the control means may switch the backlighting means on and off in a periodic manner independent from switching of the display element.

According to another embodiment of the second aspect of the invention, said backlighting means are operated cooperatively with said transmission control element. By, for example, controlling switching of the segments and the backlighting by using the same control means, it becomes straightforward to synchronize switching of the segments and the backlighting means, in order to increase the functionality and effects thereof.

According to another embodiment of the present invention, the electrowetting element comprises a plurality of segments, and the method of operating the mirror system comprises the controlling of the segments independently from each other by the control means.

Hereinbelow, the present invention will further be described with reference to the enclosed drawings, which are directed to specific embodiments of the invention.

DETAILED DESCRIPTION OF THE EMBODIMENTS AND DRAWINGS

Figure 1:
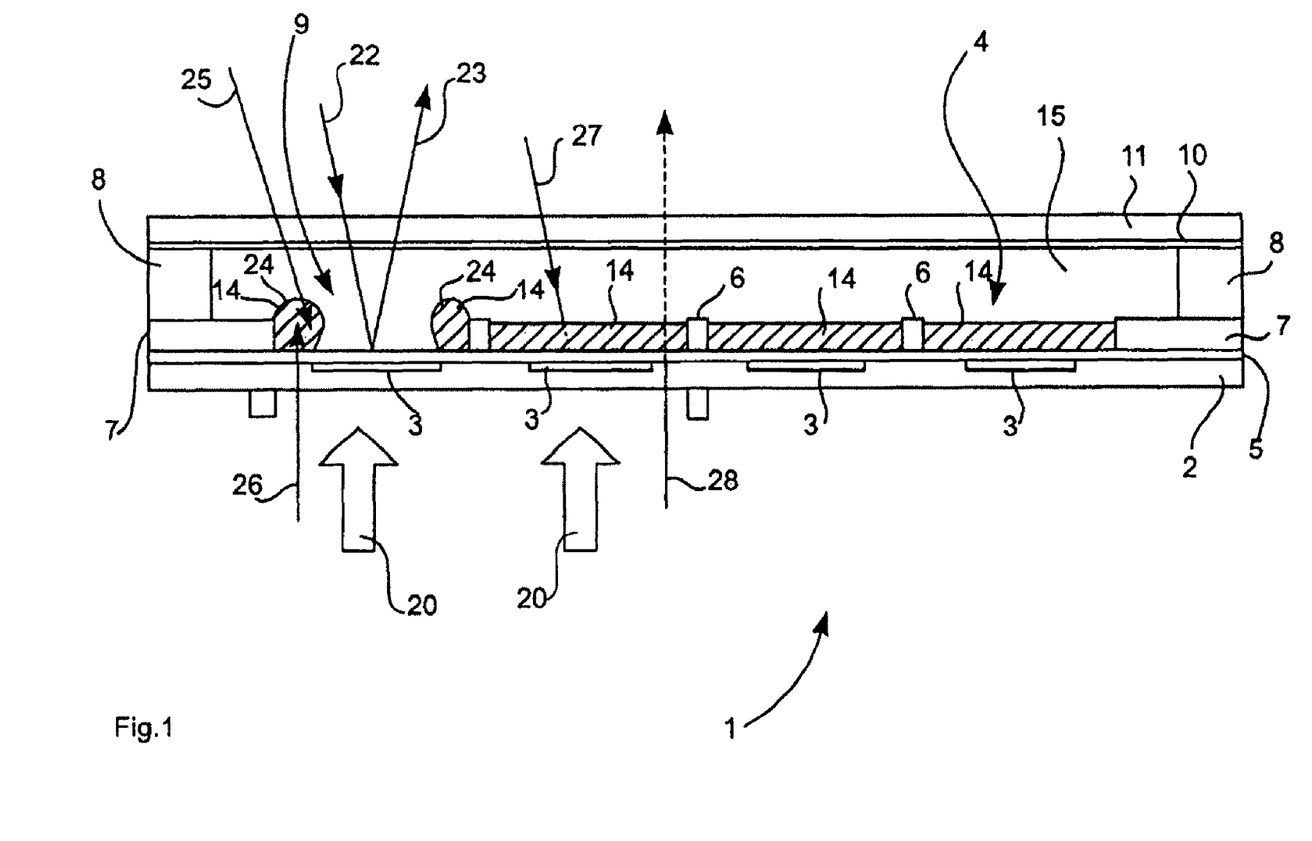
FIG. 1 schematically illustrates an embodiment of the vehicle mirror of the present invention.

FIG. 1 schematically illustrates an embodiment of the vehicle mirror system 1 of the present invention. In the vehicle mirror system 1, a support layer 2, made of for example glass, is transparent. The transparent support layer 2 contain a plurality of reflective elements 3, having on at least on one side thereof a specular reflective surface for reflecting at least a portion of the light incident on the mirror system. The reflective elements 3 at the same time form the first set of electrodes of an electrowetting element integrated in the mirror system, as will be explained in further detail below. The support layer 2 containing the elements 3, is covered with an electrically insulating layer 5 having a hydrophobic upper surface.

On top of layer 5 there is mounted a support structure consisting of a plurality of hydrophilic pixel walls 6, with a typical height of a through 5 μm, running in perpendicular directions parallel to the surface of layer 5 such as to form a matrix of pixel trays of pixel elements such as 4 and 9. On the edges of mirror system 1, the support structure consists of edge elements 7 and 8, completely enclosing the edges of the system, such that mirror system 1 can contain a liquid in its interior. On top of edge support member 8, a cover layer 11 made of transparent material such as glass, or a proper polymeric surface, closes the mirror system. The transparent cover layer 11, is on the side thereof interior to the mirror system 1, covered with a transparent conductive layer 10, again for example made of indium tin oxide (ITO), and forming a second electrode. Covering of layer 11 by layer 10 may be at least partial, such as to increase transmissability of layer 11.

In the interior of the mirror system 1, the matrix of pixel walls 6 defines pixel elements generally indicated with arrow 4. Each pixel element 4 is filled with a suitable non-polar liquid material, such as a black oil which is generally opaque of nature. A suitable oil is for example decane, but other non-polar liquids may also be applied, e.g. which by choice enriched with a suitable dye. The thickness of oil layer 14 in each pixel may be chosen such that, in combination with the other optical properties of the oil, only 10% of a light ray incident on the oil layer 14 (such as light ray 28) is transmitted by the layer 14. The rest of the space in the interior of the mirror system 1, may be filled with a transparent conductive polar liquid 15, such as a (salty) water solution.

The above-mentioned value of 10% transmission of a light ray incident on the oil layer 14 is an example given for a single pass of the light ray through the oil layer. If the light ray enters the mirror system 1 at the viewing side thereof, and is reflected by the specular reflective surface, the light ray has to pass the oil layer twice. In that case, taking 10% transmission at a single pass, only 1% of the light is transmitted at a double pass of the ray.

The invention is not limited to the above example of 10% transmission for a single pass. In practice, the transmitted fraction for a double pass should be approximately less than 10%. Since the percentage of transmission for a double pass is the square of the percentage of transmission in a single pass, than in order to achieve the above-mentioned range of less than 10% transmission in the double pass, the transmitted fraction for a single pass through the oil layer should be approximately less than 32%. The skilled person will appreciate, that in order to be able to reduce the reflection characteristics of the mirror as much as possible in operation of the mirror system, it has benefits to choose the transmitted fraction of the oil layer in single pass as small as possible (e.g. as is done for the above-mentioned example of 10% in a single pass). However the skilled person should also bear in mind that when the transmitted fraction for a single pass is chosen to the higher end of the range, e.g. 25% through 32%, still a relatively large amount of light originating from the backlighting means is able to reach the viewing surface, such that it can contribute to the display functionality of some embodiments of the mirror system. By choosing the transmitted fraction within the larger end of the range, more cost effective backlighting means with respect to power consumption can be used. An additional advantage of this is that low power backlighting means generate less heat, which is beneficial to the service life of the system.

Further to the above, it is noted that the water or water solution used as the polar liquid 15, may contain a certain amount of an additive in order to improve the operability of the mirror system under very cold or very hot conditions. By adding a certain percentage of e.g. glycol or another suitable alcohol, the freezing point of the water can be lowered to a large extent, such that the mirror system does not 'freeze' when temperatures outside drop (far) below zero degrees centigrade. At the same time, such additives have the property that the boiling point of the water or water solution used is increased. When the vehicle is for example parked in a sunny spot on a hot day, the temperature of the mirror system may easily rise to temperatures above 100 degrees Celsius, especially when the vehicle is mainly of a dark colour.

Reflective elements 3, defining the first electrodes, and transparent conductive layer 10, defining the second electrode may be powered using a power supply (not shown). In between the power supply and the electrodes 3 and 10, not shown in FIG. 1, a control unit may be included in the mirror system 1 for controlling powering of the electrodes 5 and 10.

Reflective elements 3 may be made of an electrically conductive material in order to function as electrodes. Alternatively, the elements 3 may comprise a conductive coating. Similarly, the elements 3 may be made of a conductive material comprising a specular reflective coating on at least one side. By using the reflective elements 3 as electrodes, any subdivision of pixels using the same reflective elements 3 may, where desired, be operated independently of the other pixels. As the person skilled in the art may appreciate, each pixel may comprise its own reflective element 3 that functions as an electrode for the specific pixel. An example of how subdivisions of pixels may be formed using commonly owned reflective elements, is discussed hereinafter in relation to FIG. 2.

When the system is at rest, i.e. no voltage is applied over the electrodes 3 and 10, the oil 14 forms a boundary layer covering the complete surface of the insulating hydrophobic layer 5, separating layer 5 from the polar liquid 15. In the unpowered state, this is the energetically most beneficial state of the system in view of the repellent forces between the hydrophobic layer and the polar liquid, and the surface tension forces in the liquid-liquid boundary surface between the oil 14 and the water solution 15. When a voltage is applied over electrodes 3 and 10, a capacitor arrangement is formed having on one hand the electrode 3 and electrode 10 with the conductive water solution 15, and in between the electrically conductive elements, the insulating layer 5 and the non-polar (poorly conductive) oil 14. In this situation, when the electrostatic forces are sufficiently large in order to overcome the repellent forces and surface tension forces that keep the system in balance in the unpowered state, the mirror system can lower its energy state by bringing the water solution 15 in direct contact with the insulating layer 5 such as to lower the capacitance of the system. The non-polar oil 14 is pushed aside by the conductive polar water solution 15. The reflective surface of reflective element/electrode 3 is thereby uncovered for light incident on the mirror system 1.

In the unpowered state, when electrode layers 5 and 10 are not powered by power supply 18, and when the non-polar liquid 14 forms a layer filling the space between pixel walls 6 of a pixel element 4, as mentioned above, the thickness of the liquid 14 is such, that in the present example only 10% of the light from a light ray incident on layer 14 is transmitted thereby. Illuminating the backside of mirror system 1 using a backlight generally indicated with arrows 20, causes a light ray 28 to be transmitted through the transparent support layer 2, through the insulating layer 5 into the oil layer 14 of the pixel element. Only 10% of the light ray is transmitted by the oil layer 14, as is indicated by the dotted part of the arrow 28 above the oil layer 14. The transparent cover layer 11 forms the viewing side of the mirror system 1, and a viewer observing mirror system 1 on the viewing side 11 thereof, is able to observe illumination by the backlight 20 at the unpowered pixel element as a result of transmittance of 10% of the light provided thereby by oil layer 14 in the pixel elements covered therewith. Light rays incident on the mirror surface through the viewing surface 11 thereof eventually impinge on the oil layer 14, and since they have to travel through the oil layer 14 twice (double pass as a result of reflection at reflecting surface 3), only 1% of the light thereof is reflected back by the mirror system 1. This is indicated by arrow 27.

Note that where reflective element 3 is only a one way mirror element, such that it acts as a mirror from light incident on the viewing surface 11 of the mirror system, but at the same time is transmissive for light entering the mirror system through transparent support layer 2, the amount of light from the backlighting means 20 which is transmitted through the mirror system is increased. This may be beneficial for some embodiments.

Pixel element 9 is illustrated in a powered-up state. Oil layer 14 is pushed to the side of the pixel element 9 forming curled-up layers 24 on the edge of the pixel element. These curled-up layers 24 effectively cover the transparent parts of transparent support layer 2, where transparent support layer 2 is not covered with reflective element 3. Light ray 26 produced by backlighting means 20, and incident on the support layer 2, enters the curled-up oil layer 24, and as a result of the thickness of the oil, this light is not transmitted to the other side, but is absorbed by the oil 14. At the same time, light incident on the viewing surface 11 of the mirror system 1, indicated by arrow 22, reaches the reflective surface 3 at the bottom of pixel element 9, and is effectively fully reflected back through the transparent layers to the front side of mirror system 1. As will be understood, in a powered-on state, pixel element 9 acts as a mirror. Note that any light incident from any side in the curled-up oil layer 14 on the edge of the pixel element is absorbed by the oil 14, such as arrow 25. Therefore, a certain extent of reduction of the amount of light reflected by the mirror cannot be avoided, however this is only a limited amount.

As another design option, the electrodes layer 10 shown in FIG. 1 on the interior side of viewing surface 11, can be removed and replaced by for example making the edge support member 8 electrically conductive, such that the water solution 15 in the interior of the mirror system can electrically be connected to the power supply through the edge support member 8. The benefit of this is that the optical properties of the mirror system will not be affected by a possible electrode layer 10. The person skilled in the art may appreciate that other solutions for bringing the water solution 15 electrically in contact with a power supply may be applied here.

The mirror system shown in FIG. 1 comprises the support layer 2, the electrodes 3, the insulating hydrophobic layer 5 and top of that the pixel arrangement of the electrowetting element respectively. Alternatively, this configuration can be reversed, in the sense that the reflective surface may be formed at the interior of layer 11, while the electrodes 3 may, instead of being reflective, be transparent. The backlighting means will then of course be located on the side of layer 11. Although this embodiment is less preferable, this is an obvious modification of the invention which falls within the scope of the appended claims.

Figure 2:
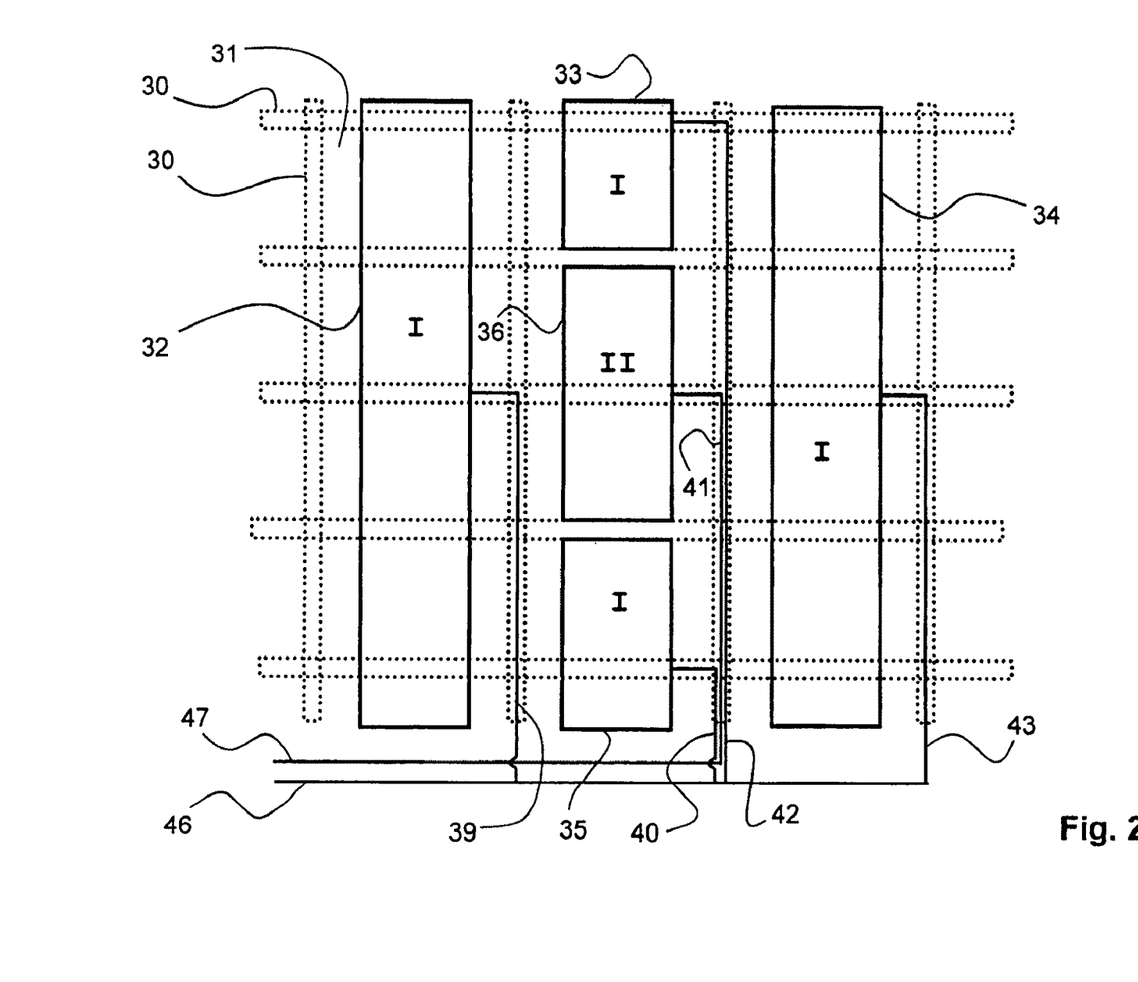
FIG. 2 illustrates an electrode configuration for controlling the switching of pixel elements of a vehicle mirror system of the present invention.

FIG. 2 schematically illustrates an electrode configuration that may be used for independently controlling different segments of the mirror surface. In the embodiment described, the pixels of the electrowetting element that is used for controllably dimming the amount of light reflected by the mirror, are divided in two segments, schematically indicated in FIG. 2 by pixels belonging to a first segment I and a second segment II. Segment II is surrounded by pixels of segment I for the present example. Pixel walls such as pixel walls 6 of FIG. 1, are indicated by dotted lines 30 for clarity purposes, in order to reveal how different electrodes of each of the segments may be connected by the power supply. A total of twelve pixels, such as pixel 31, is illustrated in FIG. 2. Electrodes 32, 33, 34 and 35, are formed by the reflective elements underneath each pixel element, and together form electrodes of the first segment I. Electrode 36 covering two pixels in the middle, forms the reflective element of segment II. The electrodes are connected with the power supply via leads that are directly underneath the pixel walls of the mirror system. The leads 39, 40, 41 and 42 to the electrodes 32, 33, 34, 35, 36, are placed underneath the pixel walls 30 running in horizontal and vertical directions on the surface of the transmissive type electrowetting elements placed on top of the reflective surface, in order not to disturb the optical properties of the mirror system.

Leads 39, 40, 42 and 43, powering electrodes 32, 35, 33 and 34 respectively, are connected to powering line 46 that enables control of segment I of the transmissive type electrowetting elements. Powerline 47 is connected to lead 41 for powering electrode 36 forming segment II of the display element.

The above-described electrode configuration may be one way of powering the electrodes of a static display configuration consisting of multiple segments of jointly controlled pixel elements, in accordance with an embodiment of the invention. Since the pixel walls (such as schematically depicted wall 30) may typically have a width of only 10 µm, the leads, the leads 39, 40, 42 and 43 will be only a few micrometers wide. Other means of connecting the electrodes 32, 33, 34 and 35 of group I, and electrode 36 of segment II would be to interconnect the electrodes of segment I and connect segment II separately. In that case, the full width of the pixel wall can be used for forming a single lead. This is within the skills of a person with ordinary skills in the art of display technology.

As mentioned, the above discloses an electrode arrangement for a static display configuration, wherein 'static' is to be understood here as a mirror system wherein the individual pixel elements cannot be switched 'on' and 'off' individually, but only as a group. In an embodiment wherein each individual pixel element is to be switched individually, independent of the other pixel elements the electrode configuration as depicted here is not suitable. The person skilled in the art will appreciate that for such a configuration, use can be made of an active matrix electrode configuration for powering up individual electrodes of the mirror system. The application of active matrix configurations for powering-up individual electrodes for pixel elements in display systems is well known in the field of display technology.

Optical properties of each single pixel element during different states of powering the electrodes of each pixel element, are illustrated by means of FIGS. 3a, 3b, 4a, 4b, 5a and 5b respectively.

Figures 3A, 3B, 4A, 4B, 5A, 5B:
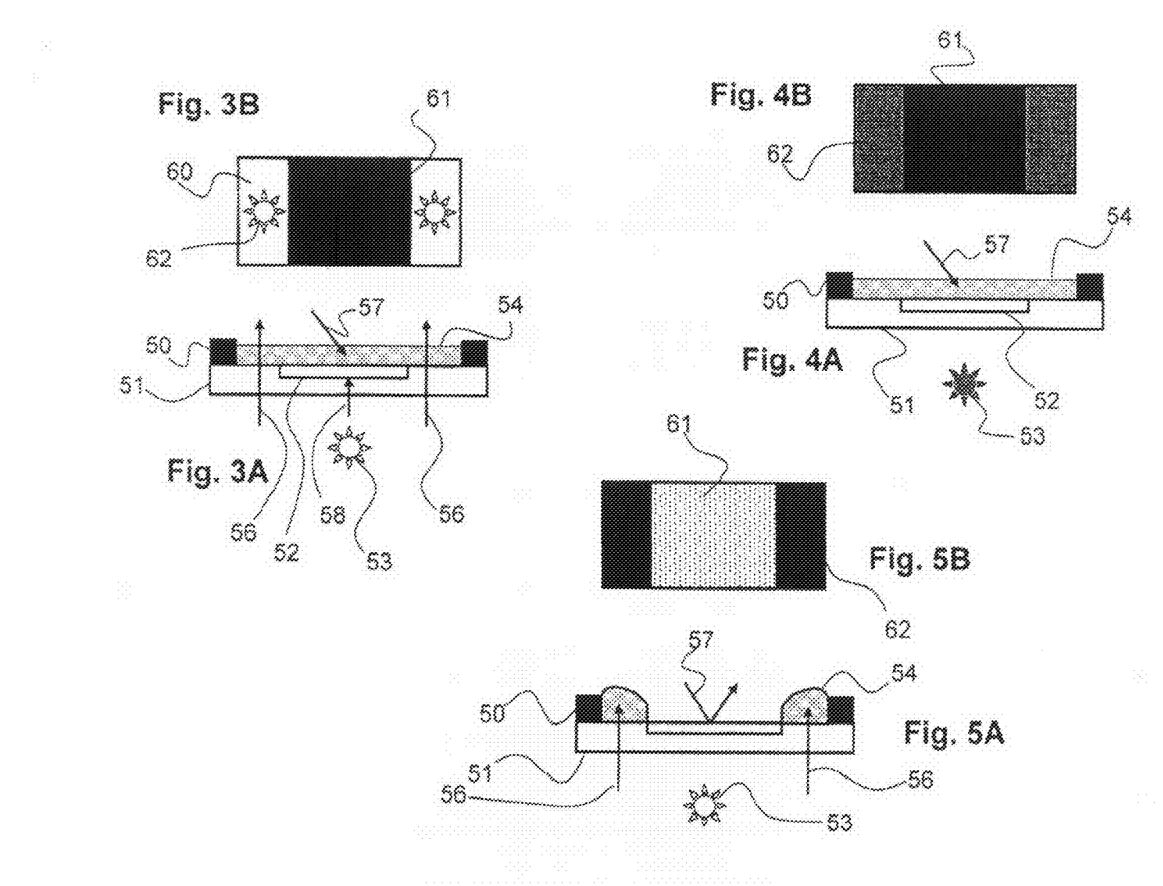
FIGS. 3a, 3b, 4a, 4b, 5a and 5b schematically illustrate the operation of a pixel element of a vehicle mirror system of the present invention.

FIG. 3a illustrates a pixel element in the 'off'-status, thus not powered, while the backlight schematically illustrated by 53 is switched 'on'. In FIG. 3a the reflective element is indicated by 52. 51 indicates the glass transparent support structure. The pixel walls of the pixel elements of the electrowetting element are indicated schematically by walls 50. The oil layer is schematically indicated by 54.

FIG. 3b depicts the pixel element from above, as seen by a viewer (strongly enlarged illustration). Light from the backlight 53 incident to the back of reflector element 52 will not be transmitted by the pixel element. However, light from the backlight that is incident on the transparent material next to the reflective element 52, indicated by arrows 56, will be transmitted through the transparent support layer 51, and partly by the oil layer 54. As indicated hereinabove, the thickness of the oil layer may be chosen such that only 10% of the light of light ray 56 is transmitted by the oil layer 54.

Light that is incident from above, indicated by arrow 57, travels through oil layer 54 to the reflective surface of reflector element 52, and has to travel back through oil layer 54 in order to leave the pixel element again. Since light ray 57 requires a double pass through the oil layer 54 only a negligible amount of light (1%) is transmitted by the oil layer, and is therefore not visible to the viewer.

A pixel switched in the 'off'-state, as described here, but being lighted by backlighting 53 from behind, is observed as indicated in FIG. 3b. The middle part 61 of the pixel is dark (black), while on the side of the pixel (parts 60 of the surface), light is partly transmitted through the oil layer 54, as indicated by 62. The colour of the light transmitted is dependent on the properties of the oil surface 54, and of course on the colour of the light used as backlighting. In principle, any suitable colour of backlighting can be used. Additionally, a dye can be added to the oil in order to change the colour thereof, or additional colour filters may be placed in the optical pass between the backlight and the viewer.

FIG. 4 indicates the same pixel in the 'off'-state, but now without backlighting. The backlight 53 is switched off, as indicated by the dark-shaded symbol 53 in FIG. 4a. Elements corresponding to the elements described in respect of FIGS. 3a and 3b are indicated by same reference numbers in FIGS. 4a and 4b.

The pixel is observed again with a black middle area 61, and dependent on the lighting conditions at the rear side of the mirror system, with black- or dark-coloured side parts 62 of the pixel (schematically indicated as shaded).

Similarly, FIGS. 5a and 5b illustrate the same pixel element, but now in a switched 'on'-state. Whether or not the backlighting 53 is turned on or off is irrelevant in this case, however for the example a switched on backlight 53 is illustrated. Light rays 56 from backlight 53 travel into the curled-up oil edges at the side of the pixel, but are not transmitted because of the thickness of the oil locally. Therefore, in the pixel as illustrated in FIG. 5b, the side parts of the pixel surface appear black to the viewer. The middle part 61 of the pixel exposes the reflective surface of reflector element 52. Since reflector element 52 is a specular reflective element, the pixel element now operates as a mirror.

The amount of light transmitted by the mirror can effectively be reduced by switching the pixel elements on and off in a periodic manner, wherein the duty cycle between the switched 'on'- and the switched 'off'-state determines the amount of light that is effectively reflected by the mirror. Backlight 53 can be switched on and off as desired, and the switching of backlight 53 can be synchronized with the switching of the pixel element. It is to be noted, however, that light by the backlight is only transmitted by the pixel element when the pixel element itself is switched off.

Note that aperture means may be added to the configurations disclosed so far. Such aperture means, which may be present in between the backlight and the specular reflective surface of the mirror system, enable signalling of indicators or indicator lights through the mirror to the user of the system. These indicators may include arrows, empty fuel tank indicators, head light indicators, and all other operational indicators that may be suitable in respect of the application wherein they are used.

The pixel walls in the present invention can be made of any suitable material, having any arbitrary optical property. It is however observed by the inventors of the present invention, that using a dark or black material for the pixel walls described hereinabove, increases the visibility of the image reflected by the mirror. Light coloured or transparent pixel walls provide certain optical distortion of the image, and may therefore blur the image to a certain extent. It will be understood that the pixel walls are therefore preferably made of a dark or black material.

The invention is not limited to any specific shape of the pixels, or to any specific arrangement of pixels on the surface of an electrowetting element. Pixels may be square, rectangular, hexagonal, or may comprise another suitable shape. Pixels may be arranged in a matrix configuration (columns and rows), or may be arranged in a staggering configuration (such as bricks in a wall, or a honeycomb configuration). Any arbitrary shape or arrangement may be applied, by choice of the skilled person.

For the purpose of comprehensiveness, it is noted here that numerous modifications and variations of the present invention are possible in the light of the above teachings. It is therefore understood that, within the scope of the amended claims, the invention may be practised otherwise than as specifically described herein.

The invention claimed is:

1. A mirror system having a viewing surface for being operable as a mirror, said mirror system comprising a specular reflective surface arranged for reflecting at least a portion of light incident on the mirror system, and means for controlling an amount of light transmitted between said specular reflective surface and said viewing surface, said means for controlling said amount of light transmitted comprising at least one transmission control element and means for controlling said transmission control element, wherein said transmission control element comprises an electrowetting element, characterized in that, said mirror system further comprises backlighting means, and said specular reflective surface is further arranged for enabling transmission of light from said backlighting means, and wherein said specular reflective surface and said transmission control element are arranged for cooperatively, in operation, transmitting said light from said backlighting means conversely dependent on transmission of light reflected by said specular reflective elements.

2. The mirror system as in claim 1, further comprising at least color filter of at least one color for colouring said light from said backlighting means.

3. The mirror system as in claim 1, wherein said electrowetting element comprises one or more electrodes, and wherein said specular reflective surface is formed by at least one side of at least one of said electrodes.

4. The mirror system as in claim 1, further comprising aperture means arranged for blocking at least part of said light from said backlighting means, for illuminating a light pattern on said mirror system using said backlighting means.

5. Mirror system according to claim 4, wherein said light pattern resemble an indicator sign for presenting information to a user of said mirror system.

6. The mirror system according to claim 1, wherein said specular reflective surface comprises at least one transmissive surface area part which is at least partly transparent for said light from said backlighting means, an at least one specular reflective surface area part which is opaque for light froth said backlighting means.

7. The mirror system according to claim 6, wherein said transmission control element is arranged for controlling transmission of light received through said transmissive surface area part conversely dependent on transmission of light received through said specular reflective surface area part.

8. Mirror system according to claim 7, wherein said electrowetting element comprises at least one first liquid and at least one second liquid, said first liquid being less transparent than said second liquid, and wherein transmission is controlled in operation by rearranging said first liquid relative to said second liquid, and wherein said electrowetting element is arranged for, in operation, in a first state contracting said first liquid such that said transmissive surface area part is substantially covered by said first liquid, and in a second state spreading said first liquid such that at least said specular reflective surface area part is substantially covered by said first liquid.

9. The mirror system as in claim 1, wherein said backlighting means are arranged for providing coloured light of at least one color.

10. The mirror system according to claim 9, wherein said backlighting means are arranged for providing colored light of two or more colors, and wherein said backlighting control means are arranged for controlling said backlighting means such that said backlighting means selectively provide light comprised of at least one of said two or more colors.

11. The mirror system according to claim 10, wherein said backlighting control means are arranged for controlling said backlighting means such that said backlighting means selectively provide light comprised of at least one of said two or more colors sequentially in periodic manner.

12. The mirror system as in claim 1, further comprising means for controlling operation of backlighting means.

13. The mirror system according to claim 12, wherein said means for controlling said transmission control element and said means for controlling operation of said backlighting means are arranged for cooperating with each other.

14. The mirror system according to claim 12, wherein said means for controlling said transmission control element and said means for controlling operation of said backlighting means are integrated in a mirror control means.

15. Mirror system as in claim 1, wherein said electrowetting element is formed by a plurality of pixel elements.

16. The mirror system as in claim 15, wherein said means for controlling said control element are arranged for controlling the pixel elements independently from each other.

17. The mirror system according to claim 15, wherein said specular reflective surface comprises a plurality of reflective elements, wherein each of said reflective elements forms at least one of said specular reflective surface area parts, and wherein each of said specular reflective elements only partly covers surface area of at least one of said pixel elements.

18. The mirror system according to claim 17, wherein dimension of said reflective elements is such that said reflective elements only partly cover said surface area of said pixel elements.

19. The mirror system according to claim 17, said reflective elements comprising a hole or cutout portion such that said reflective elements only partly cover said surface area of said pixel elements, said hole or cutout portion forming said at least one transmissive surface area part.

20. Mirror system as in claim 1, wherein said electrowetting element comprises a plurality of segments, and wherein said means for controlling said transmission control element are arranged for controlling said segments independently from each other.

21. The mirror system as in claim 20, wherein said electrowetting element is formed by a plurality of pixel elements, said means for controlling said transmission control element are arranged for controlling the pixel elements independently from each other and said means for controlling said transmission control element are arranged for controlling the pixel elements of at least one segment of said plurality of segments independently of each other.

22. The mirror system as in claim 21, as far as dependent on claim 20, wherein said backlighting means are arranged for providing light for transmission through at least one of said segments of said electrowetting element.

23. The mirror system as in claim 21, wherein said backlighting means are arranged for providing light transmission through at least one of said pixel elements.

24. The mirror system according to claim 23, wherein at least one of said pixel elements comprises said at least one color filter of at least one color for coloring said light from said backlighting means.

25. The mirror system as in claim 24, wherein each of said pixel elements comprises a color filter of a colour selected from a group comprising red, green and blue, wherein groups of three or more adjacently arranged pixel elements are formed in said electrowetting element, and wherein each group of pixel elements comprises at least one pixel element having a red colour filter, at least one pixel element having a green colour filter, and at least one pixel element having a blue color filter, for enabling full colour displaying of images by said electrowetting element.

26. The mirror system as claim 23, wherein said pixel elements are separated by pixel walls, and wherein said mirror system is arranged for being non-reflective near said pixel walls.

27. The mirror system according to claim 26, wherein said pixel walls are of a non-transmissive material.

28. The mirror system according to claim 27, wherein said non-transmissive material is a dark material.

29. The mirror system as in claim 26, comprising a non-transmissive screen for blocking transmission of light near said pixel walls.

30. A method of operating a mirror system comprising a viewing surface for being operable as a mirror, a specular reflective surface arranged for reflecting at least a portion of light incident on the mirror system, and means for controlling an amount of light transmitted between said specular reflective surface and said viewing surface, said means for controlling said amount of light transmitted comprising at least one transmission control element and means for controlling said transmission control element, wherein said transmission control element comprises an electrowetting element, characterised in that, said mirror system further comprises backlighting means, and said specular reflective surface is further arranged for enabling transmission of light from said backlighting means, said method comprising a step of controlling said transmission control element cooperatively with said specular reflective surface such that said light from said backlighting means is transmitted conversely dependent on transmission of light reflected by said specular reflective elements.

31. The method according to claim 30, wherein said backlighting means are operated cooperatively with said transmission control element.

32. The method according to claim 30, wherein said transmission control means switch said transmission control element in a transmissive mode and a non-transmissive mode respectively, in a periodic manner.

33. The method of operating a mirror system according to claim 32, wherein said electrowetting element comprises a plurality of segments, and wherein said transmission control means control said segments independently from each other.

* * * * *